No. 832,704. PATENTED OCT. 9, 1906.
N. STALKER.
VETERINARY APPLIANCE.
APPLICATION FILED SEPT. 13, 1905.
2 SHEETS—SHEET 1.
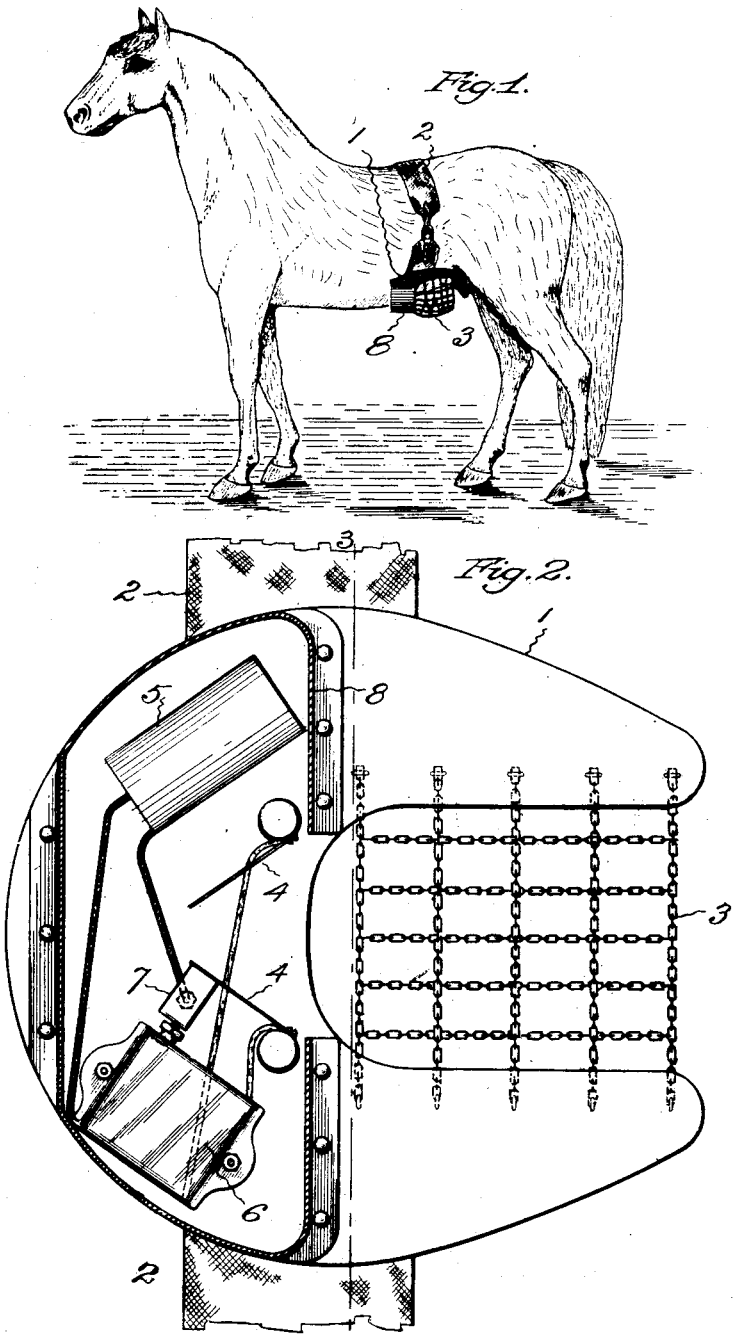

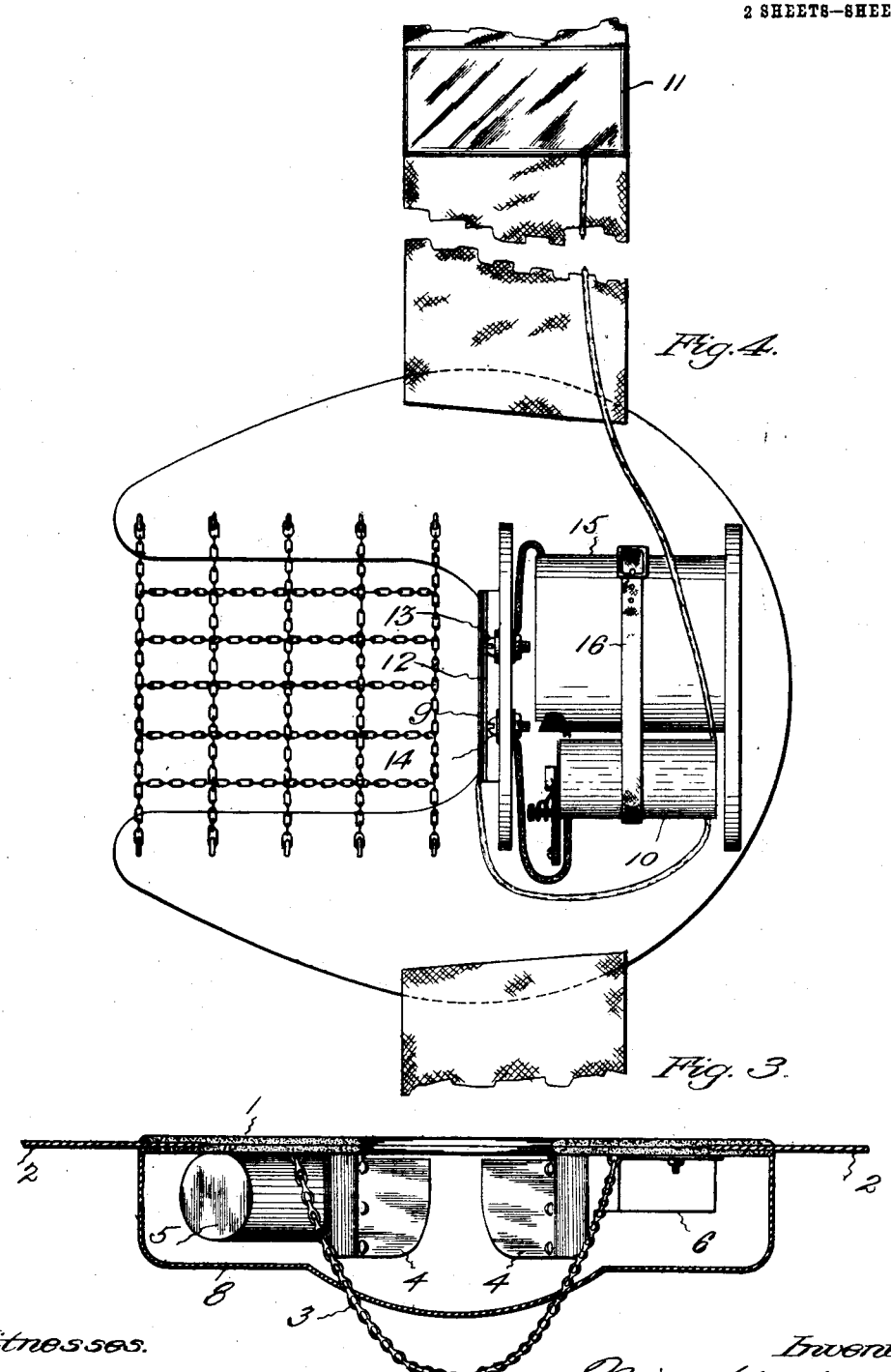

UNITED STATES PATENT OFFICE.

NEIL STALKER, OF WEST HARTFORD, CONNECTICUT.

VETERINARY APPLIANCE.

No. 832,704.           Specification of Letters Patent.           Patented Oct. 9, 1906.

Application filed September 13, 1905. Serial No. 278,221.

*To all whom it may concern:*

Be it known that I, NEIL STALKER, a citizen of the United States, residing at West Hartford, in the county of Hartford and State of Connecticut, have invented a new and useful Veterinary Appliance, of which the following is a specification.

This invention relates to a device which is designed to be applied to highly-trained and finely-bred stallions for the purpose of preventing the impairment of their vitality.

The object of the invention is to provide a cheap, cleanly, and convenient device of this nature which when applied will not injure the horse, but will efficiently treat him when occasion requires.

The embodiment of the invention that is illustrated by the accompanying drawings has a somewhat flexible shield that is adapted to be secured to a horse by a strap or surcingle and which is provided with means that will give the animal an electrical treatment when needed, as more particularly hereinafter described.

Figure 1 of the drawings shows a device applied to a horse. Fig. 2 shows a bottom view of the pad with the protecting-cover cut away and the netting pocket omitted, but with the position of the pocket indicated by dotted lines. Fig. 3 is a transverse section of the pad on the plane indicated by the line 3 3 on Fig. 2. Fig. 4 shows a bottom view of a modified form of the pad without the cover and pocket.

The horseshoe-shaped shield 1 is preferably made of one or more plies of leather, although, if desired, it may be constructed of webbing or other material. Surcingle-straps 2, preferably formed of webbing, with common buckle parts, are stitched or riveted to the shield, so that it may be secured to a horse.

A pocket 3, preferably formed of a chain net, is attached to the shield so as to hang below the opening. This pocket could, if desired, be formed of cords or of leather or canvas. The chain net, however, is preferred for the reason that it is easily cleaned.

In the form of the invention first illustrated there are attached to the under side of the shield in front of the opening a pair of flexible metallic plates 4. These plates are preferably arranged so as to converge, and the nearest ends are left free, so that they may be sprung from each other. Attached to the under side of the shield in front of one plate is a dry battery 5. One terminal of the battery is connected with one terminal of an induction-coil 6, and the other terminal of the battery is connected with a spring-finger 7, which engages one of the plates and is adapted when the plate is sprung forwardly to engage the other terminal of the induction-coil. One end of the secondary winding of the induction-coil is connected with one flexible plate, and the other end is connected with the other plate. These parts are protected by a cover 8, that is attached to the shield and is only open back of the flexible plates. When the horse becomes unduly excited and presses the flexible plates in such manner as to spring them forwardly and close the circuit, the organ which presses the plates and closes the circuit is treated by the current of electricity, which passes from one plate to the other.

In the second form of the invention shown a single flexible plate 9 is arranged on the lower part of the shield in front of the opening. This plate is connected with one end of the secondary winding of the induction-coil 10, the other end of which winding is connected with a plate 11, attached to the surcingle in such manner as to lie against the side of the horse when the apparatus is in place. Carried by the flexible plate, but insulated therefrom, is a plate 12, that is adapted to be engaged with contacts 13 and 14. One of these contacts is connected with one terminal of a dry battery 15, and the other contact is connected with a winding on the induction-coil, which winding is connected with the other terminal of the battery. When the flexible plate is pressed forwardly, connection is made between the contacts 13 and 14, and a circuit is closed through the battery and induction-coil, which establishes a current in the circuit between the plate attached to the surcingle and the flexible plate, part of which is through the body of the horse and the organ which closes the circuit. When the pressure is relieved from the flexible plate, it springs away from the contacts and opens the circuit, ending the treatment. A strap 16 may be employed for removably holding the battery and induction-coil in place.

The invention claimed is—

1. A veterinary appliance having a shield, means for attaching the shield to a horse, a pocket depending from the shield, a battery secured to the shield, an induction-coil secured to the shield, a plate at the front end of the pocket and adapted when pressed to close an electrical circuit, and wires connecting the plate and the battery and induction-coil, substantially as specified.

2. A veterinary appliance having a shield, means for attaching the shield to a horse, a pocket depending from the shield, a battery secured to the shield, an induction-coil secured to the shield, a plate at the front end of the pocket and adapted when pressed to close an electrical circuit, a cover attached to the shield, and wires connecting the plate and the battery and induction-coil, substantially as specified.

3. A veterinary appliance having a shield, straps for attaching the shield to a horse, a pocket depending from the shield, a battery, an induction-coil, a strap securing the battery and the induction-coil to the shield, a flexible plate attached to the shield in front of the pocket, a plate attached to one of the straps, and wires connecting the flexible plate, the battery, induction-coil and strap-plate, whereby when the flexible plate is pressed a circuit is completed from the plate on the strap to the flexible plate through the part that applies the pressure, substantially as specified.

NEIL STALKER.

Witnesses:
HARRY R. WILLIAMS,
ETHEL M. LOWE.